United States Patent [19]

Beyer et al.

[11] Patent Number: 4,685,251

[45] Date of Patent: Aug. 11, 1987

[54] APPARATUS FOR INDEXING TURRETS FOR TOOLS IN GRINDING MACHINES AND THE LIKE

[75] Inventors: Rudolf Beyer, Esslingen; Lutz-Peter Heerdt, Altbach; Roland Schemel, Schorndorf, all of Fed. Rep. of Germany

[73] Assignee: Schaudt Maschinenbau GmbH, Stuttgart, Fed. Rep. of Germany

[21] Appl. No.: 879,266

[22] Filed: Jun. 27, 1986

[30] Foreign Application Priority Data

Jun. 27, 1985 [DE] Fed. Rep. of Germany ....... 3523012

[51] Int. Cl.⁴ ......................... B24B 41/04; B23B 29/32
[52] U.S. Cl. ..................................... 51/166 T; 74/826
[58] Field of Search ......................... 51/166 R, 166 T; 74/826

[56] References Cited

U.S. PATENT DOCUMENTS

| 2,934,978 | 5/1960 | Estabrook | 74/826 |
| 4,080,849 | 3/1978 | Benjamin | 74/826 |
| 4,189,963 | 2/1980 | Seno | 74/826 |
| 4,461,121 | 7/1984 | Motzer | 51/166 T |
| 4,558,611 | 12/1985 | Boffelli | 74/826 |

Primary Examiner—Harold D. Whitehead
Attorney, Agent, or Firm—Peter K. Kontler

[57] ABSTRACT

A surface grinding machine wherein the turret for two grinding tools is indexible with reference to a support by disengaging the surfaces of its two coaxial sections from opposite sides of an annular component of the support. This is effected by cylinder and piston units which move one of the sections axially of any away from the other section before moving the other section away from the annular component. The one section carries one portion of a first bearing which engages the other portion of such bearing on the support when the one section is disengaged from the annular component. The other section carries one portion of a second bearing which engages another portion of the second bearing on the support in response to disengagement of the other section from the annular component. The turret is then indexible to a different position before the cylinder and piston units effect of allow a return movement of the two sections of the turret into frictional engagement with the annular component.

8 Claims, 6 Drawing Figures

APPARATUS FOR INDEXING TURRETS FOR TOOLS IN GRINDING MACHINES AND THE LIKE

CROSS-REFERENCE TO RELATED APPLICATION

The machine tool of the present invention is similar to that which is disclosed in the commonly owned copending patent application Ser. No. 879,252, filed June 27, 1986 for "Grinding Machine".

BACKGROUND OF THE INVENTION

The invention relates to apparatus for moving parts in machine tools, for example, to apparatus for moving grinding wheels or like tools in grinding machines. More particularly, the invention relates to improvements in apparatus which are used to move a mobile support for one or more selected parts (such as grinding tools) relative to a predetermined axis to and from one or more predetermined angular positions in which the mobile support is in frictional surface-to-surface engagement with a stationary support. By way of example, the apparatus of the present invention can be used with advantage to pivotally support the head of a grinding wheel carrier in a surface grinding machine.

The carrier of tools in a surface grinding machine must be pivotally mounted on its support (for example, on a cross slide) when the grinding machine is designed in such a way that the carrier of grinding tools supports two or more grinding tools, e.g., a first tool for internal grinding, a second tool for external grinding of rotary cylindrical parts, and a third tool for flat grinding. Such plural tools are preferably mounted at several sides of a substantially turret-shaped carrier which is indexible about a predetermined axis so as to move a selected tool to the grinding station. The same holds true if a substantially turret-shaped carrier supports several identical grinding tools (for example, grinding wheels) which are to be moved to the grinding station in a predetermined sequence. The means for indexing the carrier normally comprises a motor. It is often necessary to change the position of the carrier for grinding tools in different directions, for example, while grinding a conical surface or during so-called angular infeed grinding. At such times, it is necessary to move a selected grinding tool to one or more different angular positions with reference to the workpiece which is held between a headstock and a tailstock or in any other suitable way.

The art of machine tools provides a variety of auxiliary apparatus which facilitate movements of tool-bearing supports relative to stationary supports. For example, it is known to mount the tools on a carriage which is movable relative to a table or a similar stationary support. Reference may be had to German Pat. No. 719,863 which discloses an upright grinding machine with an arm which must be mechanically lifted prior to pivoting so that it is separated from a base plate with which it is in frictional engagement due to its own weight while the selected tool is located at the grinding station.

German Offenlegungsschrift No. 1,963,354 discloses another mode of reducing friction between an upper table and a lower table or the like. The object of the invention which is disclosed in this publication is to ensure that the upper table can be moved to a selected position with a minimum of friction and that such upper table can be form-lockingly held in its selected position with reference to the lower table. The publication is particularly concerned with elimination or reduction of the so-called stick-slip effect which is a phenomenon entailing adherence of the movable part to the stationary part, especially during the initial stage of movement of the movable part relative to the stationary part. The publication proposes to establish between the two tables an air cushion before the upper table is set in motion relative to the lower table.

A different mode of reducing friction between a stationary and a movable support in a machine tool or the like is disclosed in German Auslegeschrift No. 1,220,228. The machine of this publication comprises a hydrostatic bearing which is interposed between the stationary and movable supports.

The problem of accurately and predictably moving a mobile support relative to a stationary support is especially acute if the movable support is the carrier of tools in a grinding machine. This is due to the fact that the distribution of weight around the axis of rotation of the movable support is not necessarily uniform, e.g., when the center of gravity of the movable support is not located on the axis about which the movable support is to be indexed. Furthermore, the axis about which the movable support is indexed is often inclined so that the movable support tends to overhang in cantilever fashion. Additional problems arise when the movable support is installed in a grinding machine which is designed to finish workpieces with a high or utmost degree of accuracy.

OBJECTS AND SUMMARY OF THE INVENTION

An object of the invention is to provide a novel and improved apparatus which can be used to change the angular position of a movable support relative to a second support.

Another object of the invention is to provide an apparatus which can be used under circumstances when the presently known apparatus cannot do the job.

A further object of the invention is to provide an apparatus which can be utilized with advantage to change the angular position of a rotary carrier of one or more grinding tools in a surface grinding machine.

An additional object of the invention is to provide an apparatus which enables a surface grinding machine to finish workpieces with a higher degree of accuracy than heretofore known grinding machines.

Still another object of the invention is to provide novel and improved means for guiding the movable support relative to the stationary support during indexing of the movable support about a predetermined axis.

A further object of the invention is to provide a machine tool which embodies the above outlined apparatus.

A further object of the invention is to provide a novel and improved method of holding, releasing, indexing and arresting a movable tool support relative to a stationary support.

The invention is embodied in an apparatus for changing the position of at least one part, particularly a grinding tool, with reference to a predetermined axis. The apparatus comprises a first support and a second support which is rotatable relative to the first support about the predetermined axis and serves to carry one or more grinding tools or like parts. The second support is movable axially relative to the first support and the two supports have neighboring first and second surfaces which are normally in frictional engagement with one another so as to hold the second support against rotation about the predetermined axis. Such surfaces are separable from each other in response to axial movement of the second support relative to the first support to permit angular movement of the second support relative to the first support. The apparatus further comprises two coaxial bearing assemblies each of which has a first portion provided on the first support and a second portion provided on the second support. The first and second portions of each bearing assembly are separated from each other when the surfaces of the first and second supports are in frictional engagement with one another. The apparatus further comprises means for moving the second support axially to disengage the surfaces of the two supports from each other and to engage the second portions of the bearing assemblies with the respective first portions.

The second support can comprise two coaxial sections which are movable axially relative to each other and each of which carries one of the second portions. Such apparatus preferably further comprises means for biasing the two sections of the second support axially toward each other, and the moving means preferably comprises fluid operated motor means which is or are actuatable to move the sections on the second support axially and away from each other. The motor means preferably comprises a plurality of cylinder and piston units.

One section of the second support can comprise a clamping ring, and the cylinder and piston units are preferably installed in the other of the two sections. Such other section preferably carries the tool or tools.

Each bearing assembly can comprise an antifriction ball or roller bearing.

The two sections of the second support have confronting surfaces and the first support preferably comprises an annular first component which is disposed between the two surfaces. The aforementioned biasing means urges the two sections of the second support axially toward each other so that the confronting surfaces of such sections are held in frictional engagement with the annular component of the first support and the second support is reliably held against rotation relative to the first support. The aforementioned second surface is one of the confronting surfaces, namely the surface of the first section of the second component.

The first support preferably further includes second and third components which flank the first and second sections of the second support as considered in the axial direction of the first and second supports. The bearing assembly preferably comprises a first bearing including first and second portions which are respectively provided on the second component and on the first section, and a second bearing including first and second portions which are respectively provided when the third component and on the second section. The first portions of the two bearings are disengaged from the respective second portions when the confronting surfaces of the first and second sections are in frictional engagement with the first component of the first support. When the moving means is actuated, the two sections are moved axially against the opposition of the biasing means so that the confronting surfaces are disengaged from the first component and the second portions of the two bearings are moved into engagement with the respective first portions so that the second support can rotate relative to the first support while the second portions engage the respective first portions and maintain the two sections of the second support in predetermined axial positions relative to the first support.

The biasing means can comprise a plurality of bolts having shanks which are in mesh with one of the two sections of the second support and heads which project from the one section. The biasing means further comprises springs (for example, groups of dished springs) which react against the other support and bear against the heads of the bolts. The cylinder and piston units of the moving means preferably include cylinders provided in one of the two sections of the second support (for example, in the underside of the first section) and pistons which are reciprocable in the cylinders into and from engagement with the other section.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
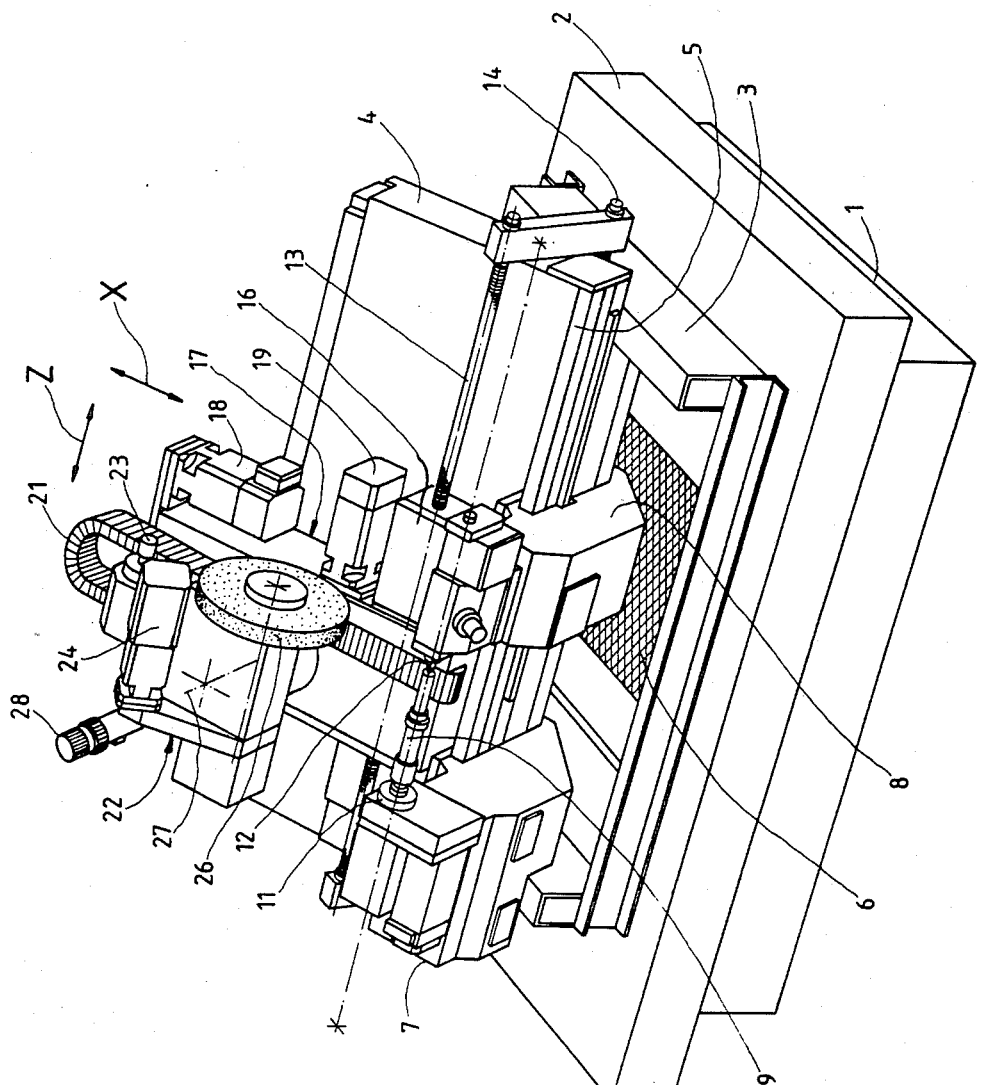
FIG. 1 is a somewhat schematic perspective view of a circular grinding machine which embodies the improved apparatus and wherein the apparatus is used to allow for changes in the angular positions of two grinding tools relative to a predetermined axis.
Figure 2:
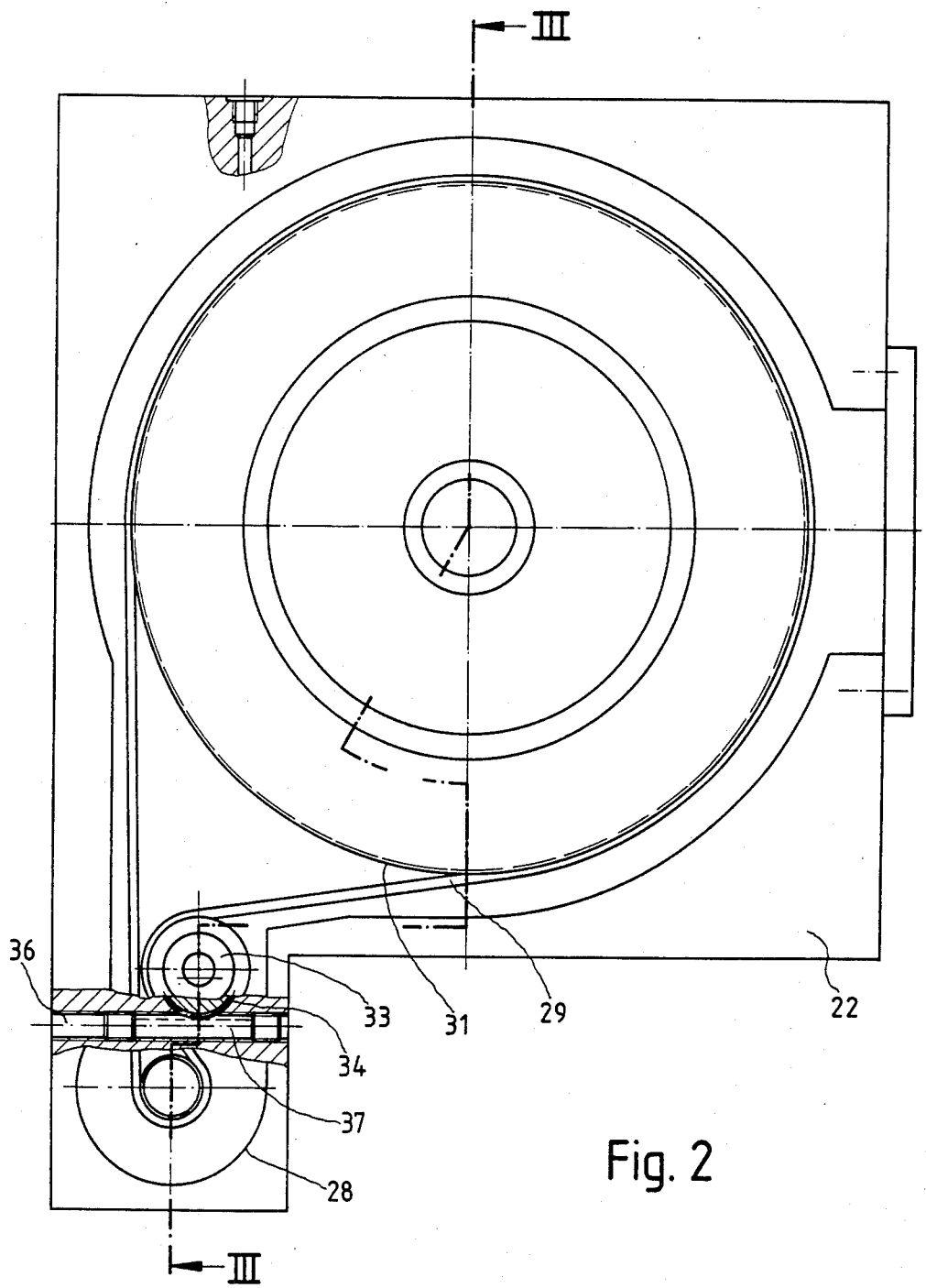
FIG. 2 is a plan view of the second support of the improved apparatus, with the grinding tools and the mounting means therefor removed.

FIG. 1 shows one form of a machine tool which can embody the improved apparatus. The illustrated machine tool is a circular grinding machine which includes a stationary understructure or base 1 for a superstructure or bed 2. The bed 2 supports a rigid frame 3 for an inclined table 4. The table 4 supports the grinding tools 23 and 26.

The understructure 1 is provided with a vessel (not specifically shown) which can store a supply of liquid coolant, such as water. Coolant which is returned to the vessel in the understructure 1 must flow through the interstices of a driven endless belt-shaped filter 6.

The table 4 carries elongated horizontal guide rails 5 for a tailstock 8 forming part of the work holding means. The work holding means further comprises a headstock 7 which is fixedly secured to the table 4 and has a torque-transmitting shaft 11 arranged to rotate a workpiece 9 which is held between the torque-transmitting shaft 11 and a center 12 on the reciprocable tailstock 8. The tailstock 8 is reciprocable so as to allow for the treatment of shorter or longer shaft-like workpieces 9 or analogous rotary parts. The table 4 further supports a cross slide 17 which is reciprocable in the direction of the X-axis by a first motor 18 as well as in the direction of the Z-axis by a second motor 19 in conjunction with a tensioned feed screw 13. One-sided tensioning of the feed screw 13 is compensated for by a tensioning rod 14 in a manner not forming part of the present invention. The feed screw 13 cooperates with a transmission which is covered by a shroud 16. The reference character 21 denotes a flexible cable which serves to connect the energy-consuming device or devices on the cross slide 17 with a suitable energy source (not shown).

Figure 3:
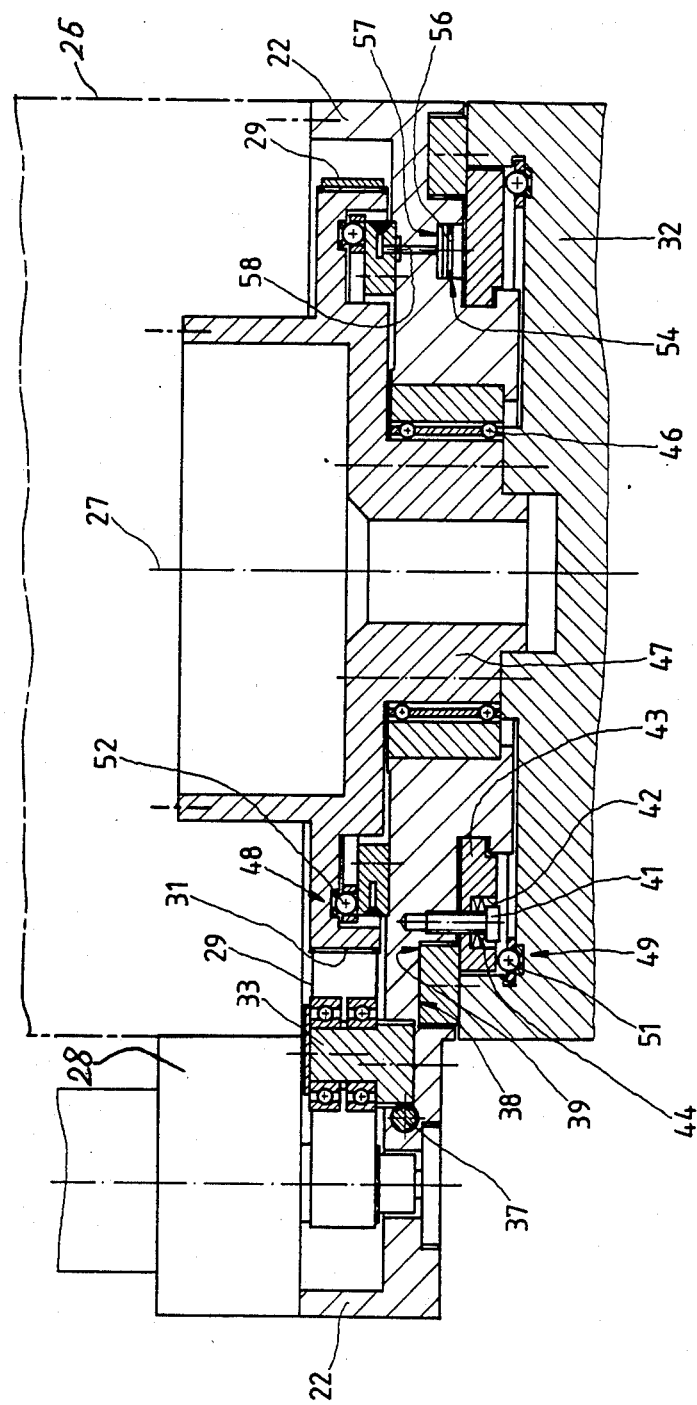
FIG. 3 is a fragmentary sectional view as seen in the direction of arrows from the line III—III in FIG. 2.

The cross slide 17 comprises the components 32, 132, 47 (see FIGS. 4a, 4b and 4c) of a first support, and such first support mounts a second support including an upper section or head 22 and a lower section in the form of a clamping ring 43. The head 22 includes a detachable top portion 25 (indicated in FIG. 3 by phantom lines) which supports the grinding tools 23 and 26. The grinding tool 23 is a pin-shaped element which serves for internal grinding, and the grinding tool 26 is a rotary wheel 26 which can be driven by a motor 24. The purpose of the grinding wheel 24 is to treat the external surface of the workpiece 9 which is held between the headstock 7 and the tailstock 8 and is rotated by the torque-transmitting shaft 11.

The improved apparatus which includes the aforementioned first and second supports serves to move the grinding tools 23 and 26 about a predetermined axis 27 (shown by phantom lines in FIGS. 1 and 3) so that the tool 26 is held in the operative position of FIG. 1 while the tool 23 is held in an inoperative position or vice versa. In the illustrated embodiment, the second support including the head 22 must be rotated through 180 degrees in order to move the tool 26 from the operative position to the inoperative position (this entails the placing of the tool 23 to its operative position) or vice versa. The means for rotating the second support relative to the first support about the axis 27 comprises a motor 28 which is mounted on and shares the angular movements of the second support. In the illustrated embodiment, the motor 28 is mounted on the head 22 and its output element drives a first toothed pulley for an internally toothed endless belt 29 which is trained about a stationary toothed pulley 31 secured to the component 32 of the first support. When the output element of the motor 28 is driven in a clockwise or counterclockwise direction, the head 22 is caused to turn about the axis 27. The pulley 31 can be bolted or otherwise rigidly secured to the component 32 of the first support. The means for tensioning the belt 29 comprises a roller 33 having an eccentric upper portion (see FIG. 3) surrounded by several ball bearings which engage the adjacent portion of the external surface of the belt 29. The lower portion of the roller 33 constitutes a pinion 34 which is in mesh with a toothed rack 37 reciprocable in a bore 36 of the head 22. The tensioning of the belt 29 can be changed by changing the axial position of the rack 37 to thereby change the angular position of the pinion 34 which causes the eccentric upper portion of the roller 33 to stretch the belt or to permit the belt to relax.

Figure 4A:
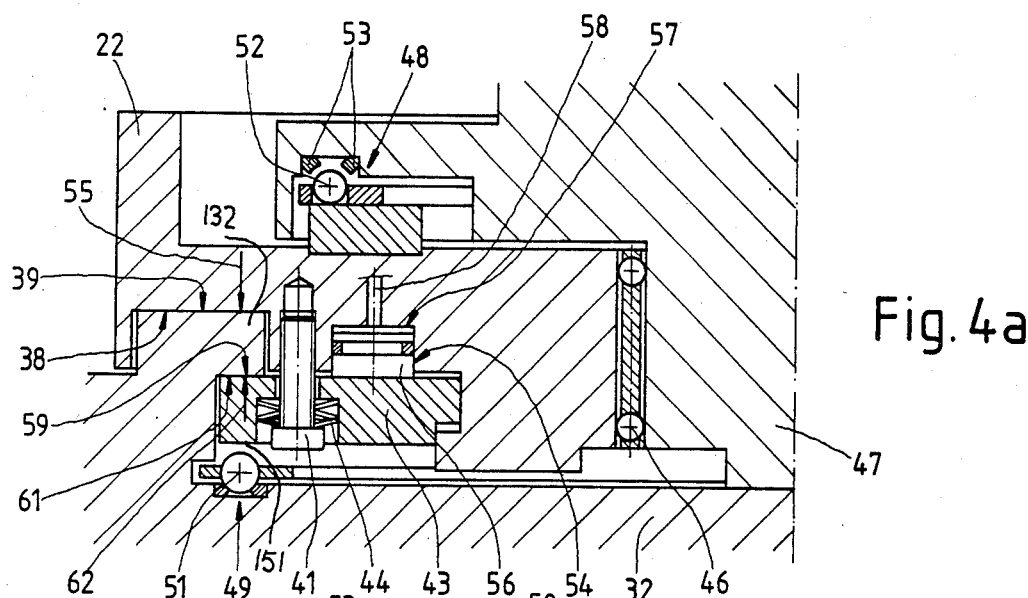
FIG. 4a is an enlarged fragmentary view of a detail in FIG. 3, showing the second support in that axial position in which its surface bears against the adjacent surface of the first support.
Figure 4B:
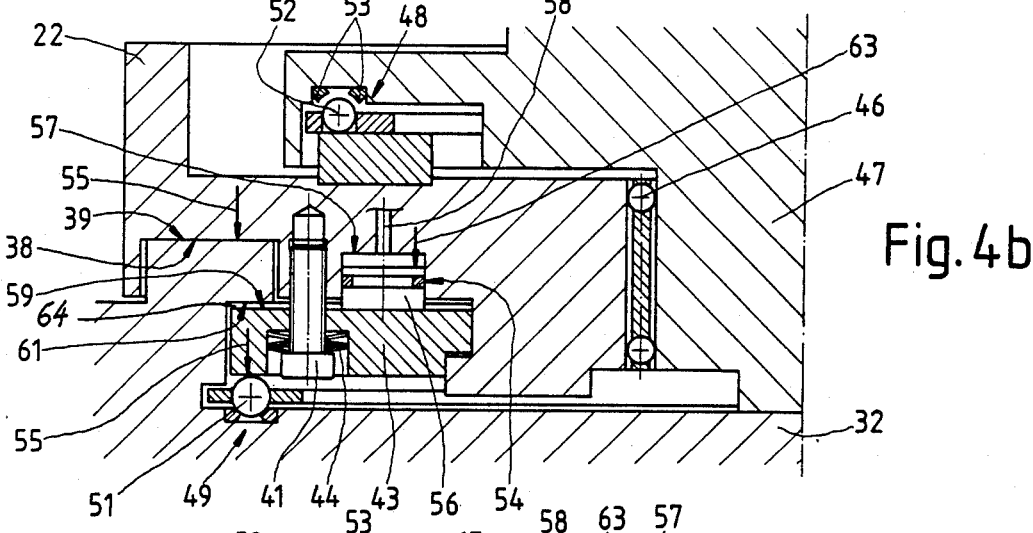
FIG. 4b illustrates the structure of FIG. 4a but with the second section of the second support disengaged from the first support.
Figure 4C:
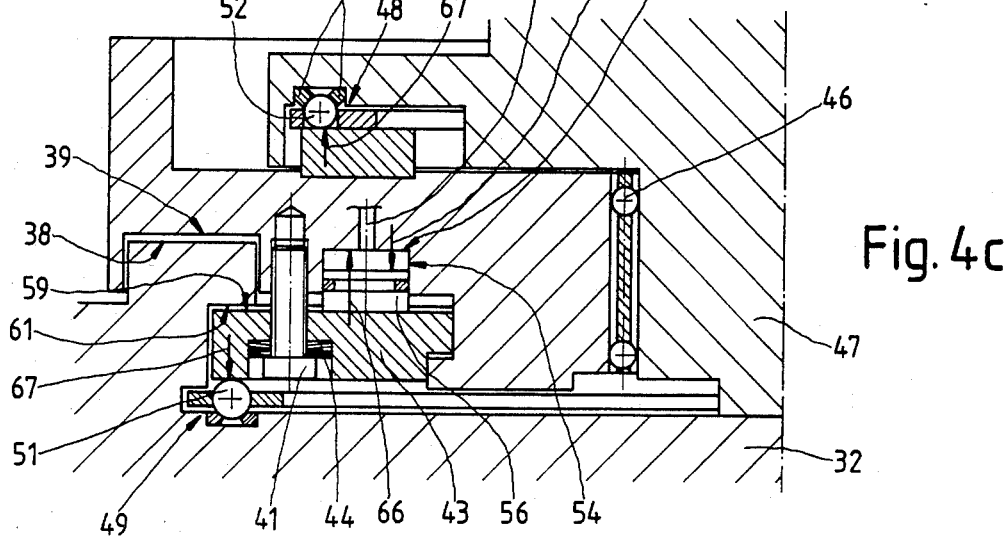
FIG. 4c illustrates the structure of FIGS. 4a and 4b but with both sections of the second support disengaged from the first support so that the second support is free to rotate relative to the first support.

The manner in which the head 22 is held in one of its two predetermined angular positions while the grinding tool 23 or 26 is held in its operative position is shown in FIGS. 4a, 4b and 4c. As shown in FIG. 4a, the head 22 has a surface 39 which bears against the adjacent surface 38 of the component 32 of the first support when the head 22 is held in either of its two operative positions. The surfaces 38 and 39 are in frictional engagement with each other and prevent any angular displacement of the head 22 relative to the component 32. The frictional engagement between the surfaces 38 and 39 is promoted by the weight of the second support including the head 22 and the clamping ring 43 as well as by the bias of several sets of dished springs 44 which bear against the heads of the associated bolts 41. The shanks of such bolts are threaded into tapped bores in the underside of the head 22. The groups of dished springs 44 react against the clamping ring 43 so that such springs tend to move the sections 22 and 43 of the second support axially toward each other, i.e., the springs tend to move the clamping ring 43 upwardly and the head 22 downwardly, as seen in FIG. 4a. At the same time, the upper surface 61 of the clamping ring 43 bears against the surface 59 at the underside of the annular component 132 of the first support. The annular component 132 constitutes an integral part of the component 32. In other words, the component 132 is clamped between the surface 39 of the section or head 22 and the surface 61 of the section or clamping ring 43. The clamping ring 43 preferably carries a complete set of equidistant bolts 41 and a group of dished springs 41 for each bolt. This ensures uniform distribution of the bias all around the circumference of the clamping ring 43. The heads of the bolts 41 extend into recesses 42 which are provided in the underside of the clamping ring 43. The recesses 42 can form part of a single annular groove in the underside of the ring 43.

As can be seen by comparing FIGS. 4a and 4b, the ring 43 has slight freedom of axial movement relative to the components 32 and 132 of the first support. This ring shares all angular movements of the head 22 relative to the first support. A cylindrical sleeve 46 which carries two annuli of balls or analogous friction-reducing elements is interposed between the cylindrical radially innermost portion of the head 22 and the adjacent external surface of the component 47 of the first support. The component 47 is a post which is threadedly connected with the component 32 and serves to center the second support including the head 22 and the clamping ring 43.

In accordance with a feature of the invention, the improved apparatus further comprises two bearing assemblies 48 and 49. The bearing assembly 48 includes a ball or roller bearing 52 which is mounted on the head 22 and a second portion 53 which is mounted in a recess of the component 47. The second bearing assembly 49 comprises a ball or roller bearing 51 mounted on the component 32 and a second portion 151 constituting a portion of the underside of the clamping ring 43. The arrangement is such that the portions 52, 53 of the bearing assembly 48 and the portions 51, 151 of the bearing assembly 49 are separated from each other when the surface 39 of the head 22 engages the surface 38 of the annular component 132. This can be seen in FIG. 4a. Thus, the bearing assemblies 48, 49 are inoperative when the second support of the improved apparatus is held in one of the two operative positions.

The means for moving the second support of the apparatus axially relative to the first support includes several fluid-operated motors 54 each of which includes a cylinder 57 provided in the underside of the head 22, a piston 56 which is reciprocable in the respective cylinder 57 and can engage the surface 59 of the clamping ring 43, and a conduit 58 which is machined into the head 22 and serves to supply a gaseous or a hydraulic pressurized fluid for reciprocation of the respective piston 56. Fluid which is admitted into a cylinder 57 acts against the upper side of the respective piston 56 as well as against the bottom surface in the respective cylinder 57 so as to urge the piston into engagement with the clamping ring 43 and to thereby displace the clamping ring downwardly against the opposition of the groups of dished springs 44.

The improved apparatus operates in two stages, namely the fluid-operated motors 54 are arranged to first disengage the clamping ring 43 from the component 132 of the first support, and to thereupon disengage the surface 39 of the head 22 from the surface 38 of the component 132.

The operation of the improved apparatus is as follows:

It is assumed that the head 22 maintains the grinding tool 26 in the operative position of FIG. 1. If it is necessary to move the grinding tool 23 to the operative position, the second support including the head 22 and the clamping ring 43 must be rotated through an angle of 180 degrees. This angular movement of the second support is possible upon a reduction of friction between the surfaces 38 and 39. Such friction is generated by a first force which is indicated by the arrows 55 and is generated by the weight of the second support 22, 43 the bolts 41, the springs 44, the moving means 54, and the ball bearing 52 of the upper bearing assembly 48. Furthermore, it is necessary to overcome the force which is active between the upper side or surface 59 of the clamping ring 43 and the underside 61 of the component 132 and is indicated by the arrow 62. Such force is generated by the springs 44 which bias the clamping ring 43 upwardly.

When the conduits 58 are caused to admit a pressurized gaseous or hydraulic fluid medium into the upper portions of the respective cylinders 57, the pistons 56 are caused to move downwardly and to bear against the upper side 59 of the clamping ring 43. The force which is generated by the pressurized fluid is indicated by the arrow 63. Such force overcomes the friction between the surfaces 59 and 61 by moving the clamping ring 43 downwardly so that the springs 44 store additional energy and the surfaces 59 and 61 define a narrow gap 64 as shown in FIG. 4b. This results in a movement of the portion 151 of the lower bearing assembly 49 against the rolling elements of the lower antifriction bearing 51 so that the force 55 (denoting the weight of the second support) is applied to the lower bearing 51. The transfer of the force 55 from the surface 38 to the rolling elements of the bearing 51 takes place gradually in response to progressive storing of energy by the springs 44. This completes the first stage of axial movement of the second support, namely the axial movement of the clamping ring 43 relative to the head 22 in a direction away from the component 132 and toward the bearing 51 of the lower bearing assembly 49.

The cylinders 57 continue to receive pressurized fluid so that the pistons 56 continue to move outwardly and cause the head 22 of the second support to move upwardly with attendant movement of the bearing 52 toward the stationary portion 53 of the upper bearing assembly 48. Such movement of the head 22 entails a separation of the surfaces 38 and 39 (see FIG. 4c) so that the second support is free to turn relative to the first support whereby the second support is guided by the portions 53 and 51 of the bearing assemblies 48, 49, respectively. The direction in which the head 22 is moved upwardly is indicated by the arrow 66. The stationary portions 53 and 51 of the two bearing assemblies are thereby subjected to the action of oppositely directed forces including that which is indicated by the arrows 67 and acts upon the lower bearing 51. The magnitude of such force equals the force which is generated by pressurized fluid in the cylinders 57 minus the weight of the head 22. At such time, the surface 39 of the head 22 is separated from the surface 38 of the component 132 so that the motor 28 can turn the second support relative to the first support while the underside of the clamping ring 43 travels along the apices of the rolling elements of the bearing 51 and the rolling elements of the bearing 52 roll along the adjacent surfaces of the stationary portion 53 of the upper bearing assembly 48. In the final step (namely when the angular movement of the head 22 through 180 degrees is completed), the pressure in the cylinders 57 of the moving means 54 is relaxed and the springs 44 are free to return the sections 22, 43 of the second support to the positions which are shown in FIG. 4a. This entails a movement of the upper bearing 52 away from the first portion 53 of the upper bearing assembly 48, a movement of the portion 151 of the lower bearing assembly 49 away from the lower bearing 51, and a movement of the surface 39 of the head 22 into frictional engagement with the surface 38 so that the second support is again held against angular movement relative to the first support.

An important advantage of the improved apparatus is that a relatively small motor 28 suffices to turn the second support relative to the first support because the surfaces 38, 39 of the two supports are fully disengaged from each other when the motor 28 is to be started in order to turn the head 22 and the clamping ring 43 about the axis 27. The apparatus can be used with equal advantage to move the second support between three or more selected angular positions, depending on the number of tools which are carried by the upper portion 25 of the head 22. The second support is invariably guided without any wobbling or other stray movements so as to ensure accurate and predictable positioning of the selected grinding tool in its operative position. All this contributes to greater accuracy of treatment of workpieces at the grinding station.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and the range of equivalence of the appended claims.

We claim:

1. Apparatus for changing the position of at least one part, particularly a grinding tool, with reference to a predetermined axis, comprising a first support, a second support rotatable with reference to said first support about said axis and arranged to carry said at least one part, said second support being movable axially relative to said first support and said supports having neighboring first and second surfaces which are normally in frictional engagement with one another to hold said second support against rotation about said axis and are separable from each other in response to axial movement of said second support relative to said first support to permit angular movement of said second support relative to said first support; two coaxial bearing assemblies each having a first portion provided on said first support and a second portion provided on said second support, the first and second portions of each of said bearing assemblies being separated from each other when said surfaces are in frictional engagement with one another; and means for moving said second support axially to disengage said surfaces from each other and to engage the second portions of said bearing assemblies with the respective first portions.

2. The apparatus of claim 1, wherein said second support comprises two coaxial sections which are movable axially relative to each other and each of which carries one of said second portions, and means for biasing said sections axially toward each other, said moving means comprising fluid operated motor means actuatable to move said sections axially and away from each other.

3. The apparatus of claim 2, wherein said motor means comprises a plurality of cylinder and piston units.

4. The apparatus of claim 2, wherein one of said sections includes a ring and said cylinder and piston units are installed in the other of said sections.

5. The apparatus of claim 1, wherein each of said bearing assemblies comprises an antifriction ball or roller bearing.

6. Apparatus for changing the position of at least one grinding tool with reference to a predetermined axis, comprising a first support; a second support rotatably mounted on said first support for rotation about said axis and including a first section arranged to carry said at least one part and a second section coaxial with said first section, said sections being movable axially toward and away from each other and respectively having confronting first and second surfaces, said first support having an annular first component disposed between said surfaces; means for biasing said sections axially toward each other so that said surfaces are held in frictional engagement with said annular component and the second support is held against rotation relative to said first support; said first support further including second and third components and said first and second sections being respectively adjacent said second and third components; a first bearing including first and second portions respectively provided on said second component and said first section; a second bearing including first and second portions respectively provided on said third component and said second section, said first portions being disengaged from the respective second portions when said surfaces are in frictional engagement with said first component; and means for moving said sections axially against the opposition of said biasing means so as to disengage said surfaces from said first component and to move the second portions of said bearings into engagement with the respective first portions so that the second support can rotate relative to said first support while said second portions engage the respective first portions and maintain said sections in predetermined axial positions relative to said first support.

7. The apparatus of claim 6, wherein said biasing means comprises a plurality of bolts having shanks meshing with one of said sections and heads, and springs reacting against the other of said supports and bearing against the heads of said bolts.

8. The apparatus of claim 6, wherein said moving means comprises a plurality of cylinder and piston units including cylinders provided in one of said sections and pistons reciprocable in said cylinders into and from engagement with the other of said sections.

* * * * *